US012007723B2

(12) United States Patent
Jornod et al.

(10) Patent No.: US 12,007,723 B2
(45) Date of Patent: Jun. 11, 2024

(54) TEST METHOD OF A THERMOELECTRIC ELEMENT

(71) Applicant: The Swatch Group Research and Development Ltd, Marin (CH)

(72) Inventors: Alain Jornod, Neuchâtel (CH); François Gueissaz, Cormondrèche (CH); David Benjamin Kraehenbuehl, Bettlach (CH)

(73) Assignee: The Swatch Group Research and Development Ltd, Marin (CH)

( * ) Notice: Subject to any disclaimer, the term of this patent is extended or adjusted under 35 U.S.C. 154(b) by 725 days.

(21) Appl. No.: 17/130,825

(22) Filed: Dec. 22, 2020

(65) Prior Publication Data

US 2021/0200157 A1 Jul. 1, 2021

(30) Foreign Application Priority Data

Dec. 31, 2019 (EP) .................................... 19220192

(51) Int. Cl.
*G04C 10/04* (2006.01)
*G04D 7/00* (2006.01)
*G04G 19/02* (2006.01)

(52) U.S. Cl.
CPC ............. *G04C 10/04* (2013.01); *G04D 7/003* (2013.01); *G04G 19/02* (2013.01)

(58) Field of Classification Search
CPC ......... G04D 7/003; G04G 19/02; G04C 10/04
USPC .......................................................... 73/54.42
See application file for complete search history.

(56) References Cited

U.S. PATENT DOCUMENTS 4,106,279 A * 8/1978 Martin .................. G04C 10/00 368/203
4,320,477 A * 3/1982 Baumgartner ......... G04G 19/02 368/64
6,061,304 A 5/2000 Nagata et al.
6,407,965 B1 * 6/2002 Matoge .................. G04C 10/00 368/204

(Continued)

FOREIGN PATENT DOCUMENTS

CN 1198223 A 11/1998
JP 3062253 B2 7/2000

(Continued)

OTHER PUBLICATIONS

Translation of JP-2002311171-A (Year: 2002).*
European Search Report of EP 19 22 0192 dated Jul. 6, 2020.

*Primary Examiner* — Nathaniel T Woodward
(74) *Attorney, Agent, or Firm* — Sughrue Mion, PLLC

(57) ABSTRACT

A testability method (500) for testing the operation of a thermoelectric element (110) of a thermoelectric watch (100) including the thermoelectric element (110), a power circuit supplied by primary storage elements (101) and secondary storage elements (102) so as to move at least one moveable element (190) or display information on an electro-optical display device. The testability method (500) includes steps of applying a heat source (540) to the thermoelectric element (110) so as to make it possible to electrically charge (550) or recharge (550) the secondary storage elements (102) in order to move at least one moveable element (190) or display information on an electro-optical display device, and thus check the functionality of the thermoelectric element (110).

7 Claims, 3 Drawing Sheets

(56) References Cited

U.S. PATENT DOCUMENTS

| | | | | |
|---|---|---|---|---|
| 6,430,111 | B1 * | 8/2002 | Shino | G04C 3/008<br>368/286 |

FOREIGN PATENT DOCUMENTS

| | | | |
|---|---|---|---|
| JP | 2002-311171 | A | 10/2002 |
| JP | 2002311171 | A * | 10/2002 |
| WO | 98/06013 | A1 | 2/1998 |

* cited by examiner

TEST METHOD OF A THERMOELECTRIC ELEMENT

CROSS REFERENCE TO RELATED APPLICATION

This application claims priority to European Patent Application No. 19220192.9 filed Dec. 31, 2019, the entire contents of which are incorporated herein by reference.

TECHNICAL FIELD

The field of the present invention relates to the field of watches including at least one thermoelectric generator, that is to say watches with a thermoelectric element converting a heat flux into electrical current by Seebeck effect.

TECHNOLOGICAL BACKGROUND

Over the past few years, we have seen the arrival on the market of watches comprising thermoelectric elements, for example Peltier elements, which make it possible to power the watch with electrical energy thanks to the heat of the user.

However, when the watch seems defective, it is difficult to distinguish the origin of the failure. Indeed, according to the quality of the various components that constitute the watch, a diagnosis may be difficult since the failure may come from three main elements that are the thermoelectric element, the electronic system, and the rechargeable battery.

SUMMARY OF THE INVENTION

The present invention proposes to solve all or part of the above-mentioned drawbacks by means of a test method for testing the operation of a thermoelectric element of a thermoelectric watch; said thermoelectric watch comprising said thermoelectric element, a power circuit supplied by primary storage elements and secondary storage elements so as to move at least one moveable element or display information on an electro-optical display device; said primary storage elements and secondary storage elements being configured to receive electrical energy from said thermoelectric element; said test method comprising steps of:

- moving the thermoelectric element away of a heat source;
- interrupting supplying the power circuit by said primary storage elements;
- electrically discharging (520) said secondary storage elements (102);
- then
- applying a heat source to said thermoelectric element; said heat source having a temperature higher than the temperature of the environment so as to
- electrically charging or recharging said secondary storage elements, and,
- supplying said thermoelectric watch by said secondary storage elements so as to move said at least one moveable element or display information on an electro-optical display device.

Thanks to this arrangement, it is possible to test if the failure or the malfunction of the watch comes from said primary storage elements or from said thermoelectric element.

According to one embodiment, the step of interrupting supplying the power circuit by the primary storage elements is controlled by the user.

Thanks to this arrangement, it is possible to interrupt the power circuit intention.

Thanks to this arrangement, it is easy to test that the electrical energy comes from said thermoelectric element and not from said primary storage elements.

“High level” means that the energy level of the secondary storage elements is sufficient or that said secondary storage elements are charged.

Conversely, “low level” means that the energy level of the secondary storage elements is insufficient or that said secondary storage elements are discharged.

Thanks to this arrangement, said thermoelectric element may power only said secondary storage elements.

According to one embodiment, said heat source applied to said thermoelectric element is preferably body heat.

Thanks to this arrangement, said thermoelectric element may provide electrical energy under normal conditions of functioning.

Thus, during the supplying step, said thermoelectric watch is supplied by said secondary storage elements, preferably said at least one moveable element and/or said at least one electro-optical display device is supplied by said secondary storage elements.

Thanks to this arrangement, said thermoelectric element powers said secondary storage elements that in turn power said thermoelectric watch.

According to one embodiment, the supplying of said thermoelectric watch by said primary storage elements only occurs after a first phase of charging, preferably the supplying of said thermoelectric watch by said primary storage elements that is controlled by the high level of energy of the secondary storage elements.

In this case, said secondary storage elements are charged or recharged before said primary storage elements.

Thanks to one or the other of these arrangements, said primary storage elements are only charged or recharged after a certain time or amount of heat.

According to one embodiment, said test method comprises a step of selecting said at least one moveable element to move from the indicator of the seconds, of the minutes, of the hours, and/or of the date.

Thanks to this arrangement, it is possible to visually test said thermoelectric element.

The present invention also relates to a thermoelectric watch comprising a thermoelectric element, a power circuit supplied by primary storage elements and secondary storage elements so as to move at least one moveable element or display information on an electro-optical display device, memory elements and a processing unit configured to implement the test method according to the invention.

BRIEF DESCRIPTION OF THE FIGURES

The invention will be described hereafter in more detail using the appended drawings, given by way of non-limiting examples, wherein.

DETAILED DESCRIPTION OF THE INVENTION

Figure 1:
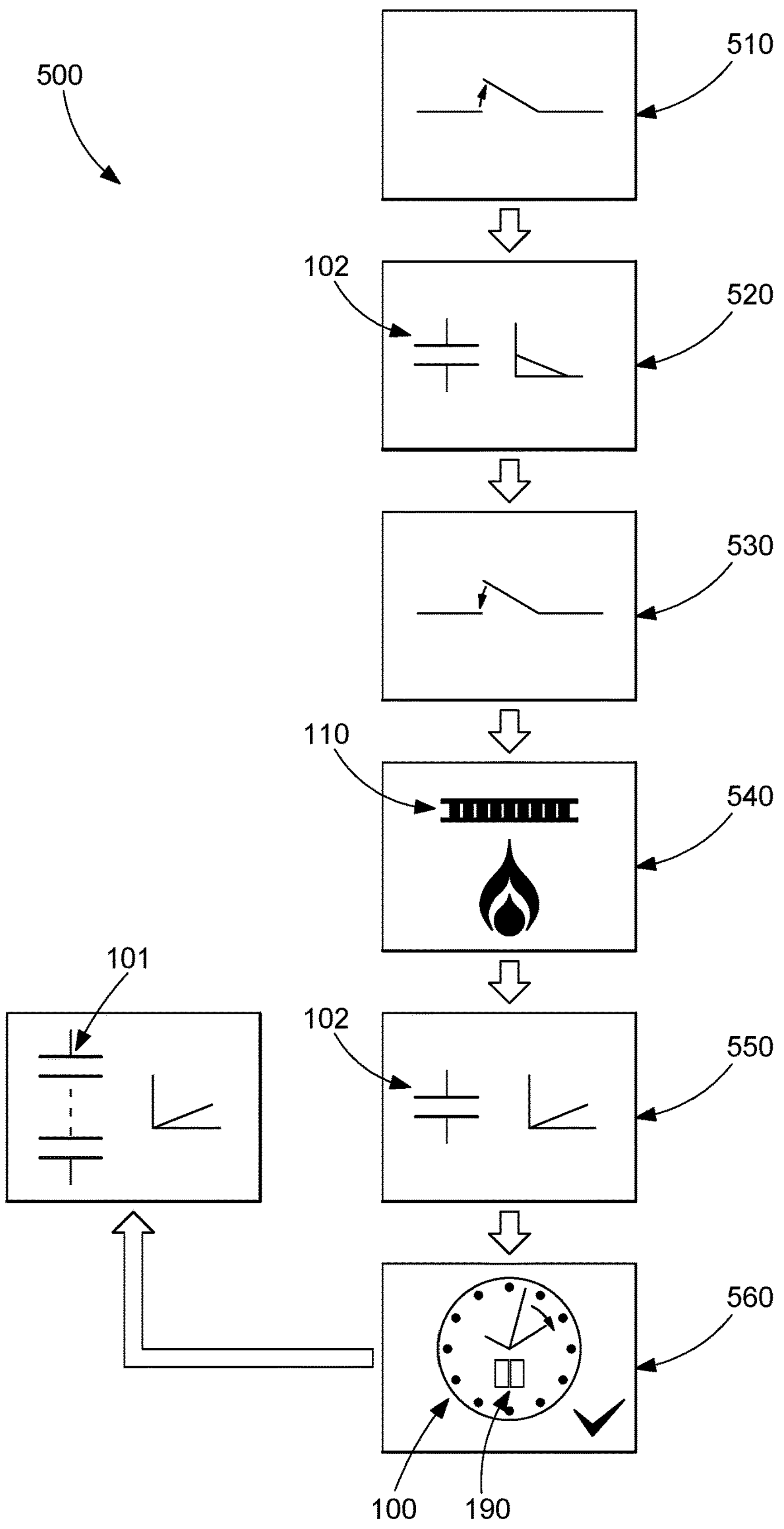
FIG. 1 presents a test method 500 for testing the operation of a thermoelectric element 110 of a thermoelectric watch 100, FIG. 2 sequentially illustrates the test method 500 and FIG. 3 discloses a functional diagram of said thermoelectric watch 100 configured to implement said test method 500 according to the invention.

The present invention proposes to test if a thermoelectric element 110 of a thermoelectric watch 100 is functional or if the failure or the malfunction has another origin such as for example a primary storage element 101, which may typically take the form of a rechargeable lithium battery by way of example.

Indeed, the present invention relates to a test method 500 for testing the operation of said thermoelectric element 110 of said thermoelectric watch 100.

Said thermoelectric watch 100 comprises said thermoelectric element 110, a power circuit supplied by primary storage elements 101, namely a lithium battery 101, preferably a rechargeable lithium battery 101 for example, and secondary storage elements 102, namely condensers for example. It is certainly pointless to specify that said primary storage elements 101 and secondary storage elements 102 are, of course configured to receive electrical energy from said thermoelectric element 110.

Moreover, said primary storage elements 101 and secondary storage elements 102 are configured to power an electronic system for moving at least one moveable element 190, typically the indicator of the seconds, of the minutes, of the hours, and/or of the date or even display information on an electro-optical display device, preferably an OLED and/or LCD display device. It should be noted that the user may select, during a selection step, which of said at least one indicator element must move in order to visually test said thermoelectric element 110.

Figure 3:
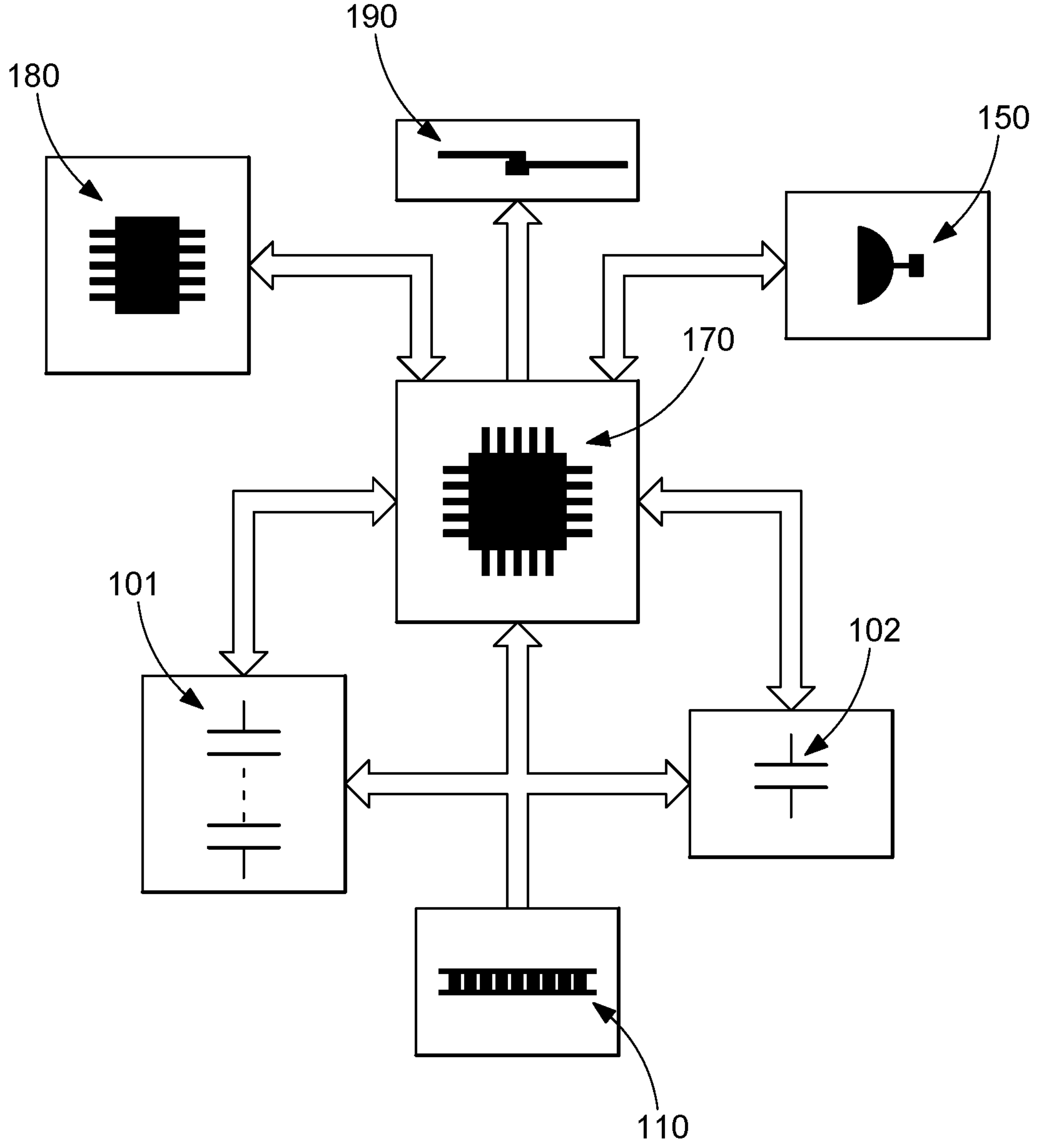

Said thermoelectric watch 100, shown on the functional diagram in FIG. 3, also comprises memory elements 180, typically RAM and/or ROM memory, and a processing unit 170, such as for example a microcontroller, microprocessor or an integrated circuit configured to implement the test method 500 described hereafter.

Said test method 500, subject matter of the present invention, normally starts by a step of moving away of the heat source 505 then of interrupting supplying 510 the power circuit by said primary storage elements so as to stop the moveable element 190. The interruption (510) of the power circuit may be activated by the user intentionally by pulling the arbor of the watch if the primary storage elements are not discharged. This step is optional since it may be that said thermoelectric watch 100 is in said state upon leaving the factory or after a certain period if the primary storage elements are discharged, which will be considered as an unintentional interruption since not intended by the user.

From this follows a step of electrically discharging 520 said secondary storage elements 102 so as to stop the operation of said thermoelectric watch 100 which will make it possible for the user to make sure that the electrical energy comes from said thermoelectric element 110 and not from said primary storage elements 101 and therefore to test said thermoelectric element 110.

Once said secondary storage elements 102 have been discharged, the power circuit is reconnected to said secondary storage elements 102.

Thus, the user may be assured that said primary and secondary storage elements 101 and 102 cannot provide stored energy and therefore move said at least one indicator element.

Indeed, said energy will only come from said thermoelectric element 110 to which a heat source is applied 540. Said heat source 540 has a temperature higher than the temperature of the environment, and preferably body temperature so that said thermoelectric element 110 can provide electrical energy to said secondary storage elements 102.

Said energy provided makes it possible to charge 550 or recharge 550, according to the initial conditions wherein is found said thermoelectric watch 100, said secondary storage elements 102.

Once the charge is sufficient, said secondary storage elements 102 power 560 said thermoelectric watch 100 with said electrical energy so as to move said at least one moveable element 190 or display information on the electro-optical display device such as an OLED or LCD display device in order to display the date for example. Thus, the user is able to test if the failure or the malfunction of the watch comes from said primary storage elements 101 or from said thermoelectric element 110 thanks to said visual.

Indeed, said thermoelectric element 110 powers said secondary storage elements 102 that in turn power 560 said thermoelectric watch 100.

It is only after a certain amount of time, or a certain level of charge of said secondary storage elements 102, that said primary storage elements 101 start to be recharged by the supplying 560 of said thermoelectric watch 100. Said recharging of said primary storage elements 101 only occurs after a first phase of charging, in other terms, after a change in state determined by the sufficient charge of said secondary storage elements 102.

Indeed, once the charge of said secondary storage elements 102 has been fully established, said primary storage elements 101 may start either to be recharged or to power said thermoelectric watch 100, but the supplying 560 of said thermoelectric watch 100 will be carried out firstly with said secondary storage elements 102 and subsequently with said primary storage elements 101.

Figure 2:
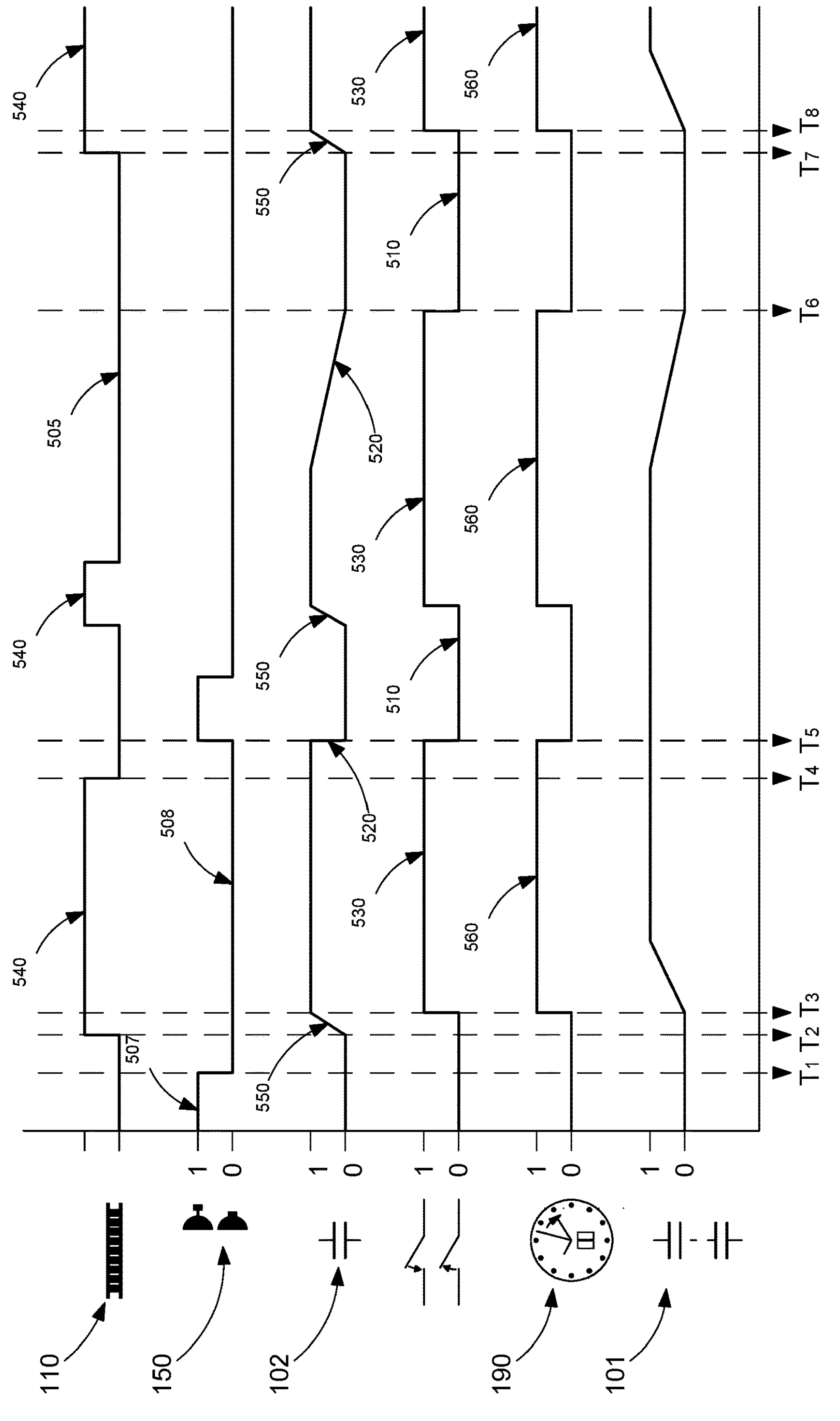

FIG. 2 sequentially illustrates the test method 500 that implements said processing unit 170.

Indeed, for example, up to the moment $T_1$, said power circuit is interrupted 510, namely disconnected, by the user intentionally, by having the crown 150 in pulled position 507 for example, and it is only after $T_1$ that the crown 150 is repositioned against the middle 508. From this follows the application of a heat source 540 to said thermoelectric element 110 at $T_2$.

From that moment on, said secondary storage elements 102 charge or recharge with energy and when the charge or recharge respectively of said secondary storage elements 102 is sufficient, that is to say when the energy level of the secondary storage elements 102 has reached the high level, for example at $T_3$, said thermoelectric watch 100, is supplied 560 with said electrical energy of said secondary storage elements 102 so as to move said at least one moveable element 190 or display information on an electro-optical display device. At the same time, said primary storage elements 101 start to charge or recharge.

Said thermoelectric watch 100 will subsequently be supplied mainly by said primary storage elements 101 up to the depletion thereof, if the user no longer wears said thermoelectric watch 100 for example, namely due to absence of heat source.

Indeed, if the user came to remove said thermoelectric watch 100 from their wrist at the moment $T_4$, in order to test the operation of said thermoelectric element 110, said power circuit 510 should be interrupted, moment $T_5$, by positioning the crown 150 in pulled position 507, which will result in the stopping of said at least one moveable element 190 or the stopping of the display on the electro-optical element.

Thus, the energy stored in said secondary storage elements 102 will rapidly no longer be sufficient for supplying said at least one moveable element 190 or the display on the electro-optical element, that is to say that the energy level of the secondary storage elements 102 is low, and said primary storage elements 101 will be maintained charged, with a slight discharge inherent to lithium batteries for example, because said power circuit by the primary storage elements 101 has been interrupted 510.

When at the moment $T_6$, the crown 150 is positioned against the middle 508 but that said primary storage elements 101 are discharged, said power circuit is disconnected 510, and the user must apply a heat source 540, moment $T_7$, to said thermoelectric element 110 to make it possible to electrically charge 550 or recharge 550 said secondary storage elements 102, and therefore power 560 said at least one moveable element 190 or display information on the electro-optical element and reconnect 530 said power circuit. Said electrical energy that first powers 560 said at least one moveable element 190 or the electro-optical display device, is drawn in said secondary storage elements 102 and not in said primary storage elements 101.

Again, when the charging or recharging of said secondary storage elements 102 is sufficient, for example at $T_8$, for supplying 560 said thermoelectric watch 100, said primary storage elements 101 is reconnected and start to charge or recharge.

the test method 500 may be implemented in different cases.

In the first case, the interruption 510 of the power circuit of the primary storage elements should be controlled intentionally by pulling the crown 150. From that moment on, the primary storage elements are isolated from the power circuit, the secondary storage elements discharge and the moveable element stops.

Subsequently, the crown 150 is pushed back against the middle, which makes it possible to reconnect the power circuit 530 to the secondary elements, however, the primary storage elements are still isolated from the power circuit, the secondary storage elements are still discharged and the moveable element is still stopped.

A heat source is applied, which has the effect of recharging the secondary storage elements but not the primary storage elements, because the primary storage elements are still isolated from the power circuit, the moveable element activates and this makes it possible to check that the thermoelectric element is functional. If the heat source is sufficient for maintaining the motion of the moveable element and recharging the primary storage elements, the primary storage elements are reconnected to the power circuit.

In another case, the power circuit is interrupted, unintentionally because the primary and secondary storage elements are discharged, the moveable element is stopped.

The intentional control for isolating the power circuit is deactivated, that is to say the crown 150 is against the middle, the primary storage elements are still isolated from the power circuit, the primary and secondary storage elements are still discharged and the moveable element is still stopped.

The heat source is applied and the secondary storage elements charge but not the primary storage elements because still isolated from the power circuit.

The moveable element activates but the primary storage elements are still isolated from the power circuit therefore it is indeed checked that the thermoelectric element is functional. And finally, if the heat source is sufficient for maintaining the motion of the moveable element and recharging the primary storage elements, the primary storage elements are reconnected to the power circuit and is charged by the thermoelectric element.

The invention claimed is:

1. A test method for testing the operation of a thermoelectric element of a thermoelectric watch; said thermoelectric watch comprising said thermoelectric element, at least one moveable element or display information on an electro-optical display device; a power circuit supplied by primary storage elements, forming a battery, and secondary storage elements, formed by condensers, and supplying the thermoelectric watch so as to move said at least one moveable element or display information on an electro-optical display device; said primary storage elements and secondary storage elements being configured to receive electrical energy from said thermoelectric element; said test method comprising steps of:

moving the thermoelectric element away of a heat source;

interrupting supplying the power circuit by said primary storage elements;

electrically discharging said secondary storage elements; then applying a heat source to said thermoelectric element; said heat source having a temperature higher than the temperature of the environment so as to electrically charge or recharge said secondary storage elements, and, supply said thermoelectric watch by said secondary storage elements so as to move said at least one moveable element or display information on an electro-optical display device.

2. The test method according to claim 1, wherein the step of interrupting supplying the power circuit is controlled by the user.

3. The test method according to claim 1, wherein said heat source (540) applied to said thermoelectric element is heat.

4. The method according to claim 1, wherein a supplying of said thermoelectric watch by said primary storage elements only occurs after a first phase of charging.

5. The test method according to claim 1, further comprising a step of selecting said at least one moveable element to move from an indicator of seconds, of minutes, of hours, and/or of date.

6. A thermoelectric watch comprising a thermoelectric element, a power circuit supplied by primary storage elements and secondary storage elements so as to move at least one moveable element or display information on an electro-optical display device, memory elements and a processing unit configured to implement the test method according to claim 1.

7. The testability method according to claim 1, wherein the test method further comprises a step of isolating the power circuit prior to the step of applying a heat source and based on one of a change in a position of a crown of the thermoelectric watch and a discharge of both of the primary storage elements and the secondary storage elements.

* * * * *